United States Patent
Kang et al.

(10) Patent No.: US 12,500,319 B2
(45) Date of Patent: Dec. 16, 2025

(54) SECONDARY BATTERY AND DEVICE INCLUDING THE SAME

(71) Applicant: LG Energy Solution, Ltd., Seoul (KR)

(72) Inventors: Joonsup Kang, Daejeon (KR); Nak Gi Sung, Daejeon (KR); Sung Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 647 days.

(21) Appl. No.: 17/913,347

(22) PCT Filed: Oct. 6, 2021

(86) PCT No.: PCT/KR2021/013666
§ 371 (c)(1),
(2) Date: Sep. 21, 2022

(87) PCT Pub. No.: WO2022/075730
PCT Pub. Date: Apr. 14, 2022

(65) Prior Publication Data
US 2023/0155264 A1    May 18, 2023

(30) Foreign Application Priority Data
Oct. 6, 2020 (KR) .................. 10-2020-0128637
Oct. 5, 2021 (KR) .................. 10-2021-0131694

(51) Int. Cl.
*H01M 50/682* (2021.01)
*H01M 10/613* (2014.01)
(Continued)

(52) U.S. Cl.
CPC ....... *H01M 50/682* (2021.01); *H01M 50/538* (2021.01); *H01M 10/613* (2015.04);
(Continued)

(58) Field of Classification Search
CPC ............. H01M 10/613; H01M 10/643; H01M 10/654; H01M 10/6551; H01M 10/6554;
(Continued)

(56) References Cited

U.S. PATENT DOCUMENTS

2011/0318625 A1* 12/2011 Yajima ............... H01M 10/647
                                                           429/120
2013/0183566 A1*  7/2013 Wayne ............... H01M 10/643
                                                           429/120
(Continued)

FOREIGN PATENT DOCUMENTS

| CN | 205016640 U | 2/2016 |
| CN | 205016641 U | 2/2016 |

(Continued)

OTHER PUBLICATIONS

Extended European Search Report including Written Opinion for Application No. 21877981.7 dated Sep. 15, 2023, pp. 1-10.
(Continued)

*Primary Examiner* — Lingwen R Zeng
(74) *Attorney, Agent, or Firm* — Lerner David LLP (57) ABSTRACT

A secondary battery includes a jelly roll electrode assembly in which a cathode sheet, an anode sheet, and a separator interposed between the cathode sheet and the anode sheet are wound together. The secondary battery also includes a battery case to which the jelly roll electrode assembly is mounted. The battery case is configured such that a flow path recessed toward the center of the jelly roll electrode assembly is formed in the lower part of the battery case. The flow path includes a first flow path and a second flow path located in the center of the first flow path, and wherein an upper part of the second flow path is opened toward the upper part of the first flow path.

13 Claims, 6 Drawing Sheets

(51) Int. Cl.
*H01M 10/643* (2014.01)
*H01M 10/654* (2014.01)
*H01M 10/6551* (2014.01)
*H01M 10/6554* (2014.01)
*H01M 10/6556* (2014.01)
*H01M 50/102* (2021.01)
*H01M 50/107* (2021.01)
*H01M 50/538* (2021.01)

(52) U.S. Cl.
CPC ........ *H01M 10/643* (2015.04); *H01M 10/654* (2015.04); *H01M 10/6551* (2015.04); *H01M 10/6554* (2015.04); *H01M 10/6556* (2015.04); *H01M 50/102* (2021.01); *H01M 50/107* (2021.01); *Y02E 60/10* (2013.01); *Y02P 70/50* (2015.11)

(58) Field of Classification Search
CPC ........... H01M 10/6556; H01M 50/102; H01M 50/107; H01M 50/538; H01M 50/682; Y02E 60/10; Y02P 70/50
See application file for complete search history.

(56) References Cited

U.S. PATENT DOCUMENTS

| | | |
|---|---|---|
| 2015/0171462 A1 | 6/2015 | Hong et al. |
| 2017/0331142 A1* | 11/2017 | Nicholls ............. H01M 10/654 |

FOREIGN PATENT DOCUMENTS

| | | |
|---|---|---|
| EP | 3499608 A1 | 6/2019 |
| EP | 3705344 A1 | 9/2020 |
| JP | 2001313078 A | 11/2001 |
| JP | 2012174344 A | 9/2012 |
| KR | 101315672 B1 | 10/2013 |
| KR | 20170005581 A | 1/2017 |
| KR | 20190072483 A | 6/2019 |
| KR | 20190074402 A | 6/2019 |
| KR | 102028330 B1 | 10/2019 |
| KR | 102072762 B1 | 2/2020 |

OTHER PUBLICATIONS

International Search Report for Application No. PCT/KR2021/013666 mailed Feb. 8, 2022, 2 pages.
Search Report dated Nov. 11, 2024 from the Office Action for Chinese Application No. 202180020433.1 issued Nov. 20, 2024. 3 pages (see p. 1-2, categorizing the cited references).

* cited by examiner

SECONDARY BATTERY AND DEVICE INCLUDING THE SAME

CROSS REFERENCE TO RELATED APPLICATIONS

The present application is a national phase entry under 35 U.S.C. § 371 of International Application No. PCT/KR2021/013666 filed on Oct. 6, 2021, which claims the benefit of Korean Patent Application No. 10-2020-0128637 filed on Oct. 6, 2020 and Korean Patent Application No. 10-2021-0131694 filed on Oct. 5, 2021 all of which are incorporated herein by reference.

FIELD OF THE INVENTION

The present disclosure relates to a secondary battery and a device including the same, and more particularly to a secondary battery having improved cooling performance and a device including the same.

BACKGROUND OF THE INVENTION

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, such a secondary battery is classified into a cylindrical battery where an electrode assembly is built in a cylindrical metal can, a prismatic battery where an electrode assembly is built in a prismatic metal can, and a pouch type battery where an electrode assembly is built in a pouch type case formed of an aluminum laminate sheet. Among them, the cylindrical battery has an advantage of having a relatively large capacity and being structurally stable.

Particularly, in the case of a large-capacity secondary battery requiring high output, as the diameter and/or size of the battery increases, the thickness increases. With the conventional external cooling method, it may be difficult to perform sufficient cooling inside the secondary battery. Further, uniform cooling inside the secondary battery is impossible. In addition, the conventional external cooling method may form an excessive temperature gradient inside the secondary battery, and thus deviations may occur in the performance and deterioration of the secondary battery, and the risk of fire due to lithium deposition or overheating may also exist. Therefore, there is a need to develop a secondary battery having improved cooling performance in consideration of the large capacity of the secondary battery.

BRIEF SUMMARY

It is an object of the present disclosure to provide a secondary battery having improved cooling performance and a device including the same.

The objects of the present disclosure are not limited to the aforementioned objects, and other objects which are not described herein should be clearly understood by those skilled in the art from the following detailed description and the accompanying drawings.

According to one aspect of the present disclosure, there is provided a secondary battery secondary battery comprising: a jelly roll electrode assembly in which a cathode sheet, an anode sheet, and a separator interposed between the cathode sheet and the anode sheet are wound together; and a battery case to which the jelly roll electrode assembly is mounted, wherein the battery case is configured such that a flow path recessed toward the center of the jelly roll electrode assembly is formed in a lower part of the battery case, wherein the flow path comprises a first flow path and a second flow path located in a center of the first flow path, and wherein an upper part of the second flow path is opened toward an upper part of the first flow path.

A protrusion may be formed in at least any one of the first flow path and the second flow path.

The protrusion may be formed on the first flow path.

The protrusion may include at least two protrusions.

The protrusion may be formed of a cooling fin.

The at least two protrusions may be spaced apart from each other by the same distance.

The protrusions may be formed in a linear shape or a semicircular shape.

A diameter of the first flow path may be smaller than a diameter of a center of the jelly roll electrode assembly.

A height of the first flow path and the second flow path may be smaller than a height of the jelly roll electrode assembly.

A nozzle may be connected to a lower part of the second flow path, and a positive or negative pressure may be applied from the nozzle to an inside of the second flow path.

At least two connection parts may be located between the first flow path and the second flow path.

The connection part may be extended from a lower part to an upper part of the first flow path or the second flow path.

According to another aspect of the present disclosure, there is provided a device comprising the above-mentioned secondary battery.

According to embodiments, the secondary battery of the present disclosure and a device including the same can improve the cooling performance.

The effects of the present disclosure are not limited to the effects mentioned above and additional other effects not described above will be clearly understood from the detailed description and the appended drawings by those skilled in the art.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, the secondary battery according to an embodiment of the present disclosure will be described. However, the secondary battery herein is not limited to a cylindrical battery, and secondary batteries having various shapes may be described with identical or similar contents.

Figure 1:
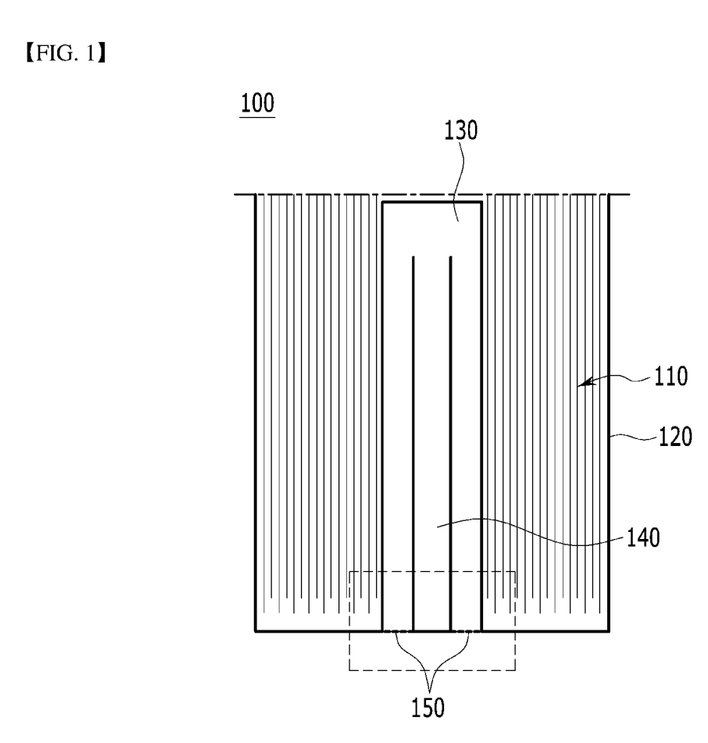
FIG. 1 is a partial cross-sectional view of a secondary battery according to an embodiment of the present disclosure.
Figure 2:
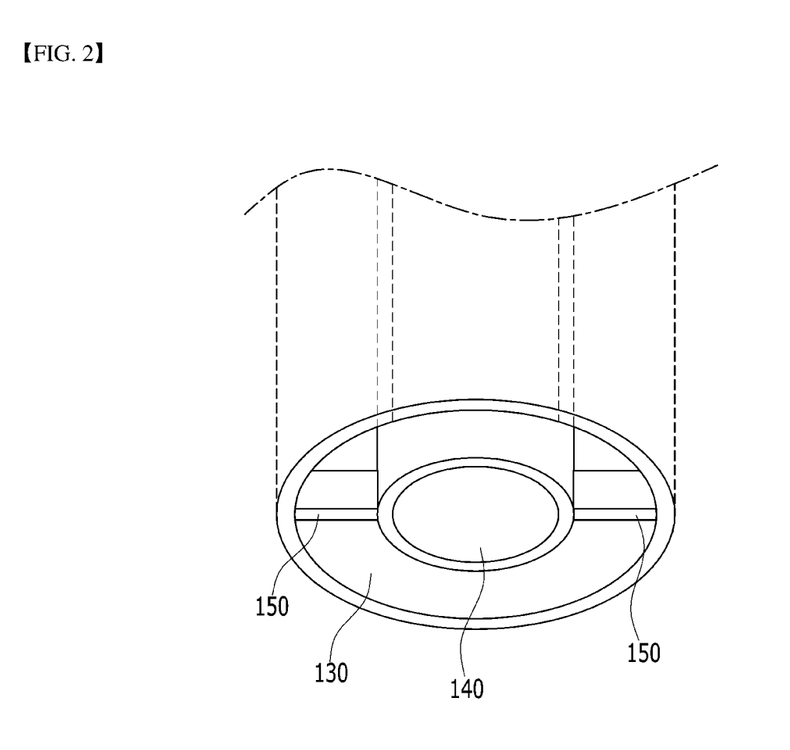
FIG. 2 is an enlarged view of the lower part of the flow path included in the secondary battery of FIG. 1.

FIG. 1 is a partial cross-sectional view of a secondary battery according to an embodiment of the present disclosure. FIG. 2 is an enlarged view of the lower part of the flow path included in the secondary battery of FIG. 1.

Referring to FIG. 1, a secondary battery 100 according to an embodiment of the present disclosure includes a jelly roll electrode assembly 110 in which a cathode sheet, an anode sheet, and a separator interposed between the cathode sheet and the anode sheet are wound together, and a battery case 120 to which the jelly roll electrode assembly 110 is mounted. Here, the battery case 120 is configured such that flow paths 130 and 140 recessed toward the center of the jelly roll electrode assembly 110 are formed in the lower part of the battery case 120.

Thereby, the secondary battery 100 according to the present embodiment is configured such that the flow paths 130 and 140 are formed in the lower part of the battery case 120 and thus, the fluid flowing into and moving to the flow paths 130 and 140 can absorb heat generated in the center of the jelly roll electrode assembly 110. Thereby, the secondary battery 100 according to the present embodiment can improve the cooling performance.

The flow paths 130 and 140 include a first flow path 130 and a second flow path 140 located at the center of the first flow path 130. Here, the upper part of the second flow path 140 is opened toward the upper part of the first flow path 130. Thereby, the fluid flowing into or flowing out to the first flow path 130 from the second flow path 140 may move in all directions toward the upper part of the first flow path 130.

Further, the first flow path 130 and the second flow path 140 allow the fluid to move through their respective upper parts. In one example, the fluid flowing into the second flow path 140 moves to the upper part of the second flow path 140 and flows into the upper part of the first flow path 130. The fluid flowing into the upper part of the first flow path 130 may move toward the lower part of the first flow path 130. On the contrary, the fluid flowing into the first flow path 130 moves to the upper part of the first flow path 130 and flows into the upper part of the second flow path 140. The fluid flowing into the upper part of the second flow path 140 may move toward the lower part of the first flow path 130.

Thereby, the flow paths 130 and 140 include the first flow path 130 and the second flow path 140, and the fluid flowing into the flow paths 130 and 140 can sequentially move through the first flow path 130 and the second flow path 140, so that the movement path of the fluid can be formed long. Further, the long-formed fluid movement path can increase the time during which the fluid flows into the flow paths 130 and 140. Further, the cooling performance of the jelly roll electrode assembly 110 can be improved.

In addition, the flow paths 130 and 140 allow the fluid to move through the upper parts of the first flow path 130 and the second flow path 140, respectively, so that a movement path formed by the first flow path 130 and the second flow path 140 may be formed longer. Further, cooling can be easily performed not only at the center of the jelly roll electrode assembly 110 adjacent to the outer surface of the battery case, but also at the upper end of the center of the jelly roll electrode assembly 110.

Referring to FIGS. 1 and 2, the diameters of the first flow path 130 and the second flow path 140 may be smaller than the diameter of the center of the jelly roll electrode assembly 110. In particular, the diameter of the first flow path 130 is smaller than the diameter of the center of the jelly roll electrode assembly 110, wherein the diameter of the second flow path 140 may be smaller than a diameter of the first flow path 130. Further, the height of the first flow path 130 and the second flow path 140 may be smaller than the height of the jelly roll electrode assembly 110. In particular, the height of the first flow path 130 is smaller than the height of the jelly roll electrode assembly 110, wherein the height of the second flow path 140 may be smaller than the height of the first flow path 130.

Referring to FIGS. 1 and 2, the secondary battery 100 according to the present embodiment may be configured such that at least two connection parts 150 are located between the first flow path 130 and the second flow path 140. Also, the connection parts 150 may be extended from a lower part to an upper part of the first flow path 130 or the second flow path 140.

Thereby, the connection part 150 can fix the second flow path 140 to the first flow path 130 without interfering with the fluid flowing into or moving to the first flow path 130 and the second flow path 140.

As an example, the connection part 150 can be formed of a material such as a cooling fin. However, the material of the connection part 150 is not limited to the cooling fin, and any member having high thermal conductivity can be included in the present embodiment.

Therefore, the connection part 150 can increase the movement time of the fluid moving along the connection part 150 in addition to the effect of fixing the first flow path 130 and the second flow path 140 to each other, and thus the cooling performance can also be further improved.

Figure 3:
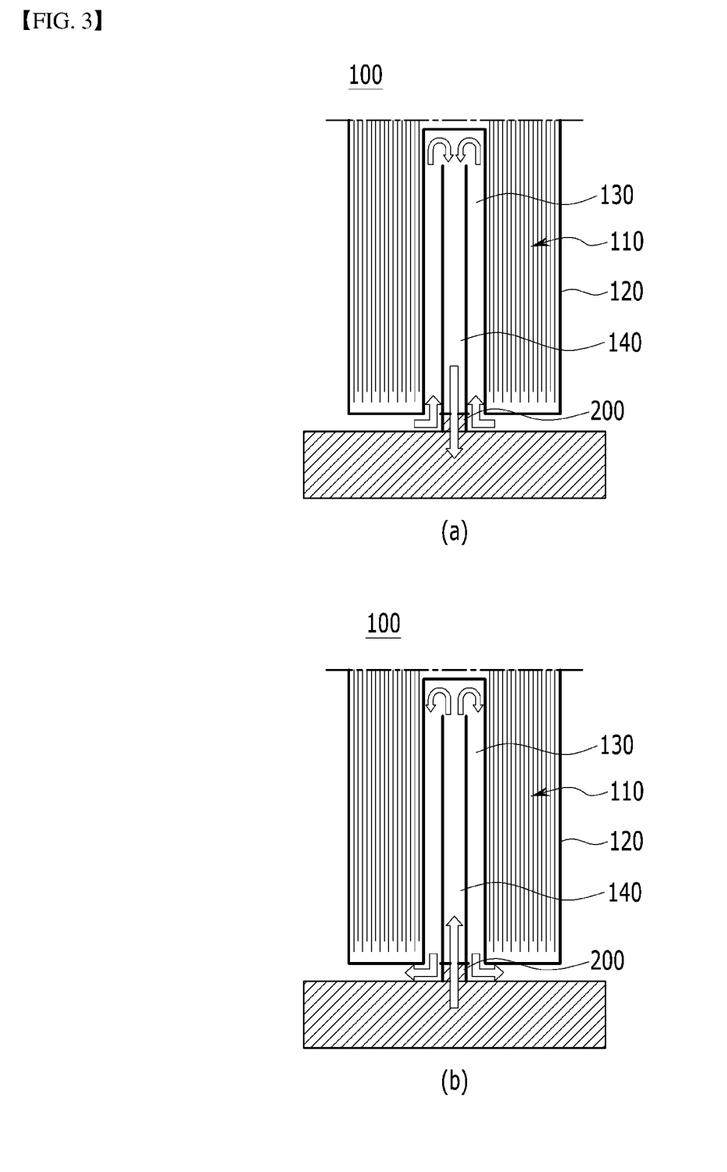
FIG. 3 is a diagram showing a structure in which an external nozzle is coupled to the secondary battery of FIG. 1.

FIG. 3 is a diagram showing a structure in which an external nozzle is coupled to the secondary battery of FIG. 1. Referring to FIG. 3, in the secondary battery 100 according to the present embodiment, a nozzle 200 may be connected to the lower part of the second flow path 140. Here, the nozzle 200 can apply a positive pressure or a negative pressure to the inside of the second flow path 140.

Referring to FIG. 3(a), when the nozzle 200 applies a negative pressure to the inside of the second flow path 140, the fluid in the inside of the second flow path 140 moves to the lower part of the second flow path 140 by the nozzle 200, and the fluid in the upper part of the first flow path 130 fills the upper part of the second flow path 140. Thereby, the fluid in the lower part of the first flow path 130 also moves to the upper part of the first flow path 130, and the lower part of the first flow path 130 allows the external fluid to move to the inside of the first flow path 130.

Similarly, referring to FIG. 3(b), when the nozzle 200 applies a positive pressure to the inside of the second flow path 140, the fluid in the inside of the second flow path 140 moves to the upper part of the second flow path 140 by the nozzle 200, and the fluid in the inside of the first flow path 130 moves to the lower part of the first flow path 130. Thereby, the fluid in the lower part of the first flow path 130 moves to the outside.

Therefore, in the secondary battery 100 according to the present embodiment, when the nozzle 150 is connected to the flow paths 130 and 140 and a positive or negative pressure is applied, the fluid in the inside of the flow paths 130 and 140 may move through a movement path formed by the first flow path 130 and the second flow path 140. Thereby, cooling of the center of the jelly roll electrode assembly 110 located adjacent to the flow paths 130 and 140 can be smoothly performed, and the cooling performance can be further improved by the pressure applied from the nozzle 200.

Figure 4:
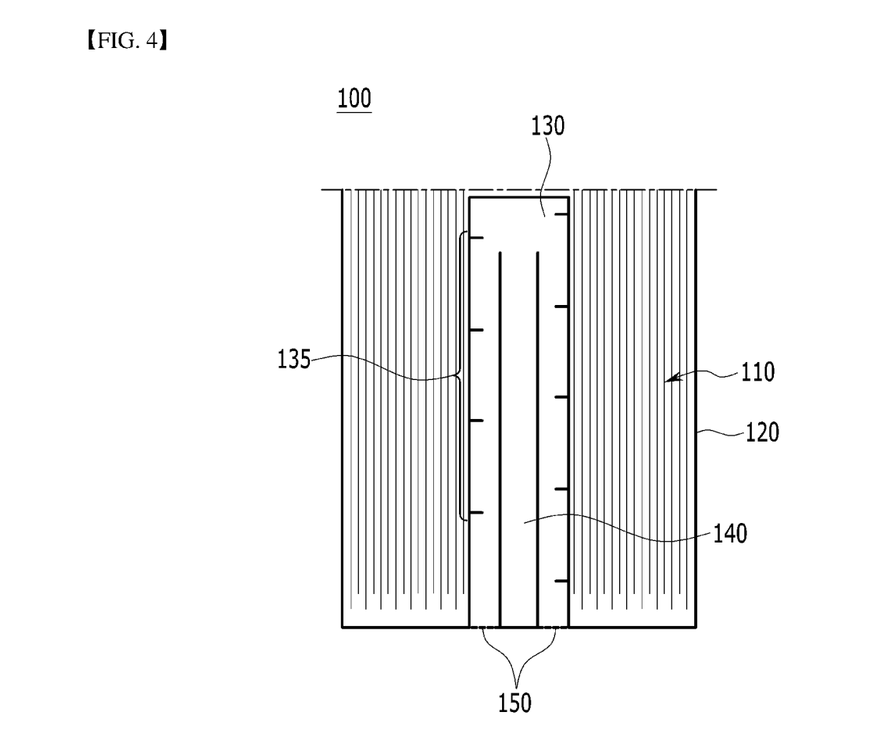
FIGS. 4 and 5 are partial cross-sectional views of a secondary battery according to another embodiment of the present disclosure.
Figure 5:
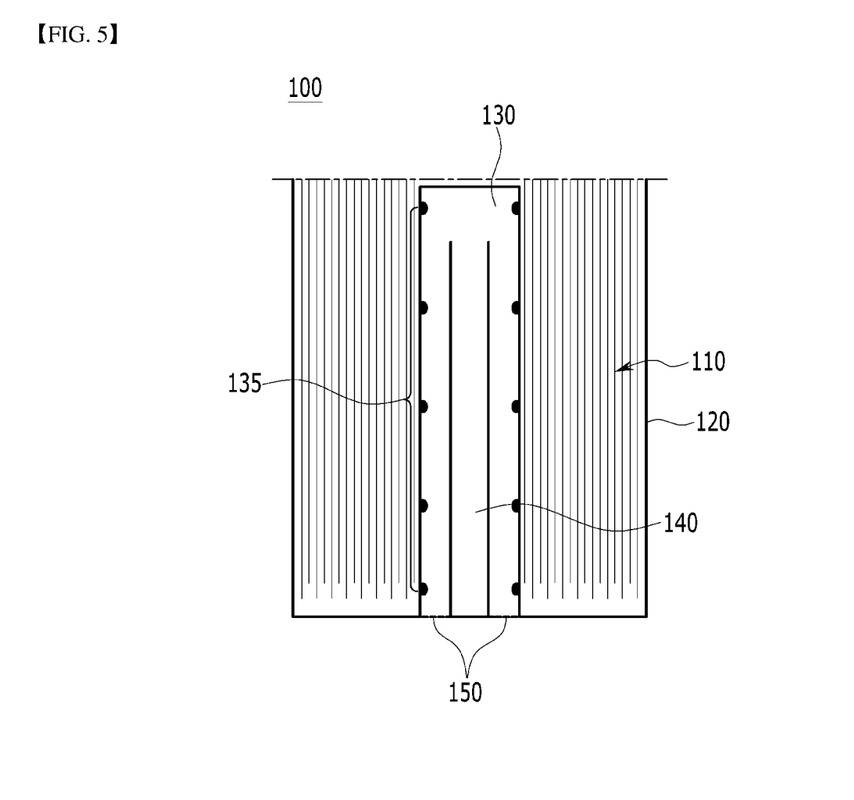

FIGS. 4 and 5 are partial cross-sectional views of a secondary battery according to another embodiment of the present disclosure.

Referring to FIGS. 4 and 5, a protrusion 135 may be formed in at least any one of the first flow path 130 and the second flow path 140.

As an example, the protrusion 135 may be formed on the first flow path 130. Here, the protrusion 135 may be formed on the first flow path 130 and may be protruded toward the second flow path 140. Thus, the protrusion 135 is formed on the first flow path 130 adjacent to the jelly roll electrode assembly 110, so that the cooling performance of the jelly roll electrode assembly 110 can be further improved.

However, the position of the protrusion 135 is not limited thereto, and can be formed on both the first flow path 130 and the second flow path 140.

More specifically, the height of the protrusion 135 may be smaller than the distance between the first flow path 130 and the second flow path 140. Therefore, the first flow path 130 includes the protrusion 135, so that the movement time of the fluid flowing between the first flow path 130 and the second flow path 140 can be lengthened, and the cooling performance can also be improved.

Further, the protrusion 135 may include at least two protrusions. The at least two protrusions may be spaced apart from each other by the same distance. Thereby, in the secondary battery 100 according to the present embodiment, the degree of cooling by the fluid flowing between the first flow path 130 and the second flow path 140 may be uniform. However, the present disclosure is not limited thereto, and the at least two protrusions may be spaced apart asymmetrically or by a non-uniform distance.

Further, the protrusion 135 includes at least two protrusions, and the protrusions may be formed of cooling fins. Thereby, the secondary battery 100 according to the present embodiment can further improve the cooling performance by the fluid flowing between the first flow path 130 and the second flow path 140.

Further, referring to FIGS. 4 and 5, the protrusion 135 includes at least two protrusions, and the protrusions may be formed in a linear shape or a semicircular shape. More preferably, the protrusion may have gently formed edges.

Thereby, in the secondary battery 100 according to the present embodiment, the fluid flowing between the first flow path 130 and the second flow path 140 can move easily without being stagnated in a specific part.

Figure 6:
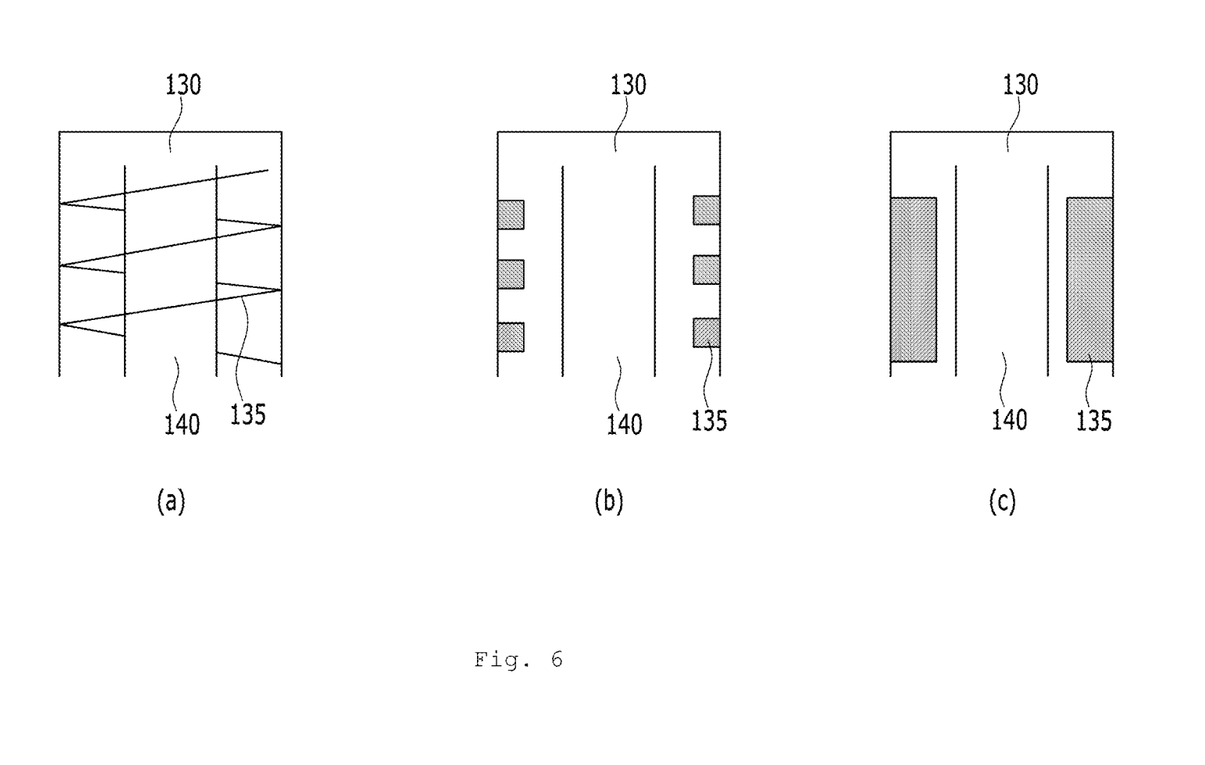
FIG. 6 is a cross-sectional view schematically showing a cross section of a flow path included in a secondary battery according to another embodiment of the present disclosure.

FIG. 6 is a cross-sectional view schematically showing a cross section of a flow path included in a secondary battery according to another embodiment of the present disclosure.

Referring to FIG. 6(a), in the secondary battery according to the present embodiment, a protrusion 135 extending in the form of a screw may be formed along between the first flow path 130 and the second flow path 140. More specifically, the protrusion 135 may be extended in an oblique direction along between the first flow path 130 and the second flow path 140.

Thereby, the length of the protrusion 135 extending along between the first flow path 130 and the second flow path 140 can be maximized, so that the movement time of the fluid flowing between the first flow path 130 and the second flow path 140 can be lengthened. That is, the contact time between the fluid and the first flow path 130 relative to the amount of the injected fluid can be effectively increased, and the cooling performance can also be improved accordingly.

Referring to FIG. 6(b), in the secondary battery according to the present embodiment, a protrusion 135 is formed between the first flow path 130 and the second flow path 140, and the protrusion 135 may include at least two rectangular plate-shaped protrusions. At this time, similarly to FIGS. 4 and 5, each of the protrusions may be spaced apart from each other by the same distance. However, the present disclosure is not limited thereto, and each of the protrusions may be spaced apart from each other asymmetrically or by a non-uniform distance.

Thereby, the protrusion 135 includes a plate-shaped projection, so that the contact area with the fluid flowing between the first flow path 130 and the second flow path 140 can be increased, and the cooling performance can also be improved accordingly. In addition, the protrusion 135 is formed on the first flow path 130 adjacent to the jelly roll electrode assembly 110, so that the cooling performance of the jelly roll electrode assembly 110 can be further improved.

Referring to FIG. 6(c), in the secondary battery according to the present embodiment, a protrusion 135 is formed between the first flow path 130 and the second flow path 140, and the protrusion 135 may be extended along the first flow path 130. At this time, the protrusion 135 may be located apart from the second flow path 140.

Thereby, the protrusion 135 has a shape extending along the first flow path 130, so that the contact area with the fluid flowing between the first flow path 130 and the second flow path 140 can be maximized, and the cooling performance can also be improved accordingly. In addition, the protrusion 135 is formed on the first flow path 130 adjacent to the jelly roll electrode assembly 110, so that cooling performance for the jelly roll electrode assembly 110 can be further improved.

The above-mentioned secondary battery can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although preferred embodiments of the present disclosure have been described in detail above, the scope of the present disclosure is not limited thereto, and various modifications and improvements can be made by those skilled in the art using the basic concepts of the present disclosure defined in the appended claims, which also falls under the scope of the present disclosure.

DESCRIPTION OF REFERENCE NUMERALS

100: secondary battery
110: jelly roll electrode assembly
120: battery case
130: first flow path
140: second flow path
150: connection part
200: nozzle

The invention claimed is:

1. A secondary battery comprising:
a jelly roll electrode assembly in which a cathode sheet, an anode sheet, and a separator interposed between the cathode sheet and the anode sheet are wound together; and
a battery case to which the jelly roll electrode assembly is mounted,
wherein the battery case is configured such that a flow path recessed toward a center of the jelly roll electrode assembly is formed in a lower part of the battery case,
wherein the flow path is defined by a first flow path element and a second flow path element located in a center of the first flow path element, and
wherein an upper part of the second flow path element is opened toward an upper part of the first flow path element; and
wherein the secondary battery further comprises at least one connecting part connecting the first flow path element to the second flow path element.

2. The secondary battery of claim 1, wherein:
a protrusion is formed in at least any one of the first flow path element and the second flow path element.

3. The secondary battery of claim 2, wherein:
the protrusion is formed on the first flow path element.

4. The secondary battery of claim 3, wherein:
the protrusion comprises at least two protrusions.

5. The secondary battery of claim 4, wherein:
the protrusion is formed of a cooling fin.

6. The secondary battery of claim 4, wherein:
the at least two protrusions are spaced apart from each other by the same distance.

7. The secondary battery of claim 4, wherein:
the protrusions are formed in a linear shape or a semicircular shape.

8. Secondary battery of claim 1, wherein:
a diameter of the first flow path element is smaller than a diameter of a center of the jelly roll electrode assembly.

9. The secondary battery of claim 8, wherein:
a height of the first flow path element and the second flow path element is smaller than a height of the jelly roll electrode assembly.

10. The secondary battery of claim 1, wherein:
a nozzle is connected to a lower part of the second flow path element, and
a positive or negative pressure is applied from the nozzle to an inside of the second flow path element.

11. The secondary battery of claim 1, wherein:
the at least one connecting part comprises two connection parts located between the first flow path element and the second flow path element.

12. The secondary battery of claim 11, wherein:
the connection part is extended from a lower part to an upper part of the first flow path element or the second flow path element.

13. A device comprising the secondary battery as set forth in claim 1.

* * * * *